(12) United States Patent
Iwasaki (10) Patent No.: US 8,045,626 B2
(45) Date of Patent: Oct. 25, 2011

(54) DIFFERENTIAL TRANSMITTER, DIFFERENTIAL RECEIVER, SIGNAL TRANSMITTER, AND SIGNAL TRANSMITTING SYSTEM

(75) Inventor: Tadashi Iwasaki, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 598 days.

(21) Appl. No.: 12/194,578

(22) Filed: Aug. 20, 2008

(65) Prior Publication Data

US 2009/0052559 A1 Feb. 26, 2009

(30) Foreign Application Priority Data

Aug. 20, 2007 (JP) ................................ 2007-213268

(51) Int. Cl.
*H04B 3/00* (2006.01)

(52) U.S. Cl. ........ 375/257; 375/219; 375/349; 375/351; 375/328; 375/330; 455/78; 455/88; 455/83; 455/91; 455/102; 455/127.5; 455/127.1; 327/65; 327/67; 327/76; 327/97; 327/229

(58) Field of Classification Search ................ 455/3, 78, 455/88, 83, 91, 102, 103, 127.1, 127.5; 327/65, 327/67, 76, 229, 97, 335; 326/30, 80, 200; 330/84; 375/257, 244, 349, 348, 330, 328, 375/295, 219, 351, 283
See application file for complete search history.

(56) References Cited

U.S. PATENT DOCUMENTS 7,595,661 B2 * 9/2009 Kim ................................. 326/82

| 2001/0027096 | A1* | 10/2001 | Lindlar | 455/343 |
|---|---|---|---|---|
| 2003/0174762 | A1* | 9/2003 | Schoenborn | 375/219 |
| 2007/0086531 | A1* | 4/2007 | Schoenborn | 375/257 |
| 2008/0037617 | A1* | 2/2008 | Tang et al. | 375/220 |

FOREIGN PATENT DOCUMENTS

| JP | 10-209830 | 8/1998 |
|---|---|---|
| JP | 10-0652391 | 11/2006 |

OTHER PUBLICATIONS

Korean Official Action—2008-81615—Jul. 20, 2010.

* cited by examiner

*Primary Examiner* — Dac Ha
*Assistant Examiner* — Rahel Guarino
(74) *Attorney, Agent, or Firm* — Young & Thompson (57) ABSTRACT

According to one embodiment of the present invention, it is possible to realize a signal transmitter which is capable of reducing power consumption and which can be easily designed. A differential transmitter block outputs differential output signals fixed to a predetermined logic signal to a differential receiver block and disconnects terminating resistors from a signal transmission path in an idle state. In the differential receiver block, a differential comparator outputs a logic determined by symbols of the differential output signal from the differential transmitter block, and an operating state detector detects the idle state upon detection that time successively outputting a predetermined logic by the differential comparator reaches a predetermined time, and controls switches so as to disconnect the terminating resistors from the signal transmitter in the receiving side upon detection of the idle state.

8 Claims, 9 Drawing Sheets

| STATE | SWITCH 116a | SWITCH 116c | SWITCH 132a AND SWITCH 132b | DESCRIPTION OF EACH STATE |
|---|---|---|---|---|
| 1 | ON | OFF | ON | NORMAL STATE (DATA BEING TRANSMITTED OR RECEIVED) |
| 2 | OFF | ON | ON | IDLE STATE NOTIFICATION (OUTPUT OF DIFFERENTIAL COMPARATOR 131: LOGIC Hi) (DISCONNECT TERMINATING RESISTORS IN TRANSMITTING SIDE) |
| 3 | OFF | ON | OFF | IDLE STATE WITH LEAST POWER CONSUMPTION (OUTPUT OF DIFFERENTIAL COMPARATOR 131: LOGIC Hi) (DISCONNECT TERMINATING RESISTORS IN TRANSMITTING AND RECEIVING SIDES) |
| 4 | ON | OFF | OFF | NORMAL STATE NOTIFICATION DATA TRANSMISSION (CONNECT TERMINATING RESISTORS IN TRANSMITTING SIDE) |
| 5 | ON | OFF | ON | NORMAL STATE RECOVERY (DATA BEING TRANSMITTED OR RECEIVED) |

DIFFERENTIAL TRANSMITTER, DIFFERENTIAL RECEIVER, SIGNAL TRANSMITTER, AND SIGNAL TRANSMITTING SYSTEM

BACKGROUND OF THE INVENTION

1. Field of the Invention

The present invention relates to a signal transmission, and more particularly, to a signal transmission technique by a differential input/output circuit.

2. Description of Related Art

Along with current advancement of an LSI (large-scale integrated circuit) manufacturing technique, a high-performance MPU (Micro Processor Unit) whose operating frequency exceeds 1 GHz has been developed. When such an MPU is employed in an information processing device or especially a server/workstation, high-speed and large amount of data transmission is needed. In order to achieve this, a system connecting the MPU with each module of a memory by PTP (Point-to-Point) employing an FB-DIMM (Fully Buffered Dual Inline Memory Module) has been used, for example. The FB-DIMM includes an AMB (Advanced Memory Buffer) chip for connection between modules mounted thereon in addition to a memory chip, and employs high-speed serial interface standard "FB-DIMM High Speed Differential PTP Link at 1.5 V" as a connection interface.

A terminating resistor is typically provided in a transceiver in consideration of an impedance matching in order to prevent influence of reflection due to the transmission path length in high-speed transmission.

Figure 7:
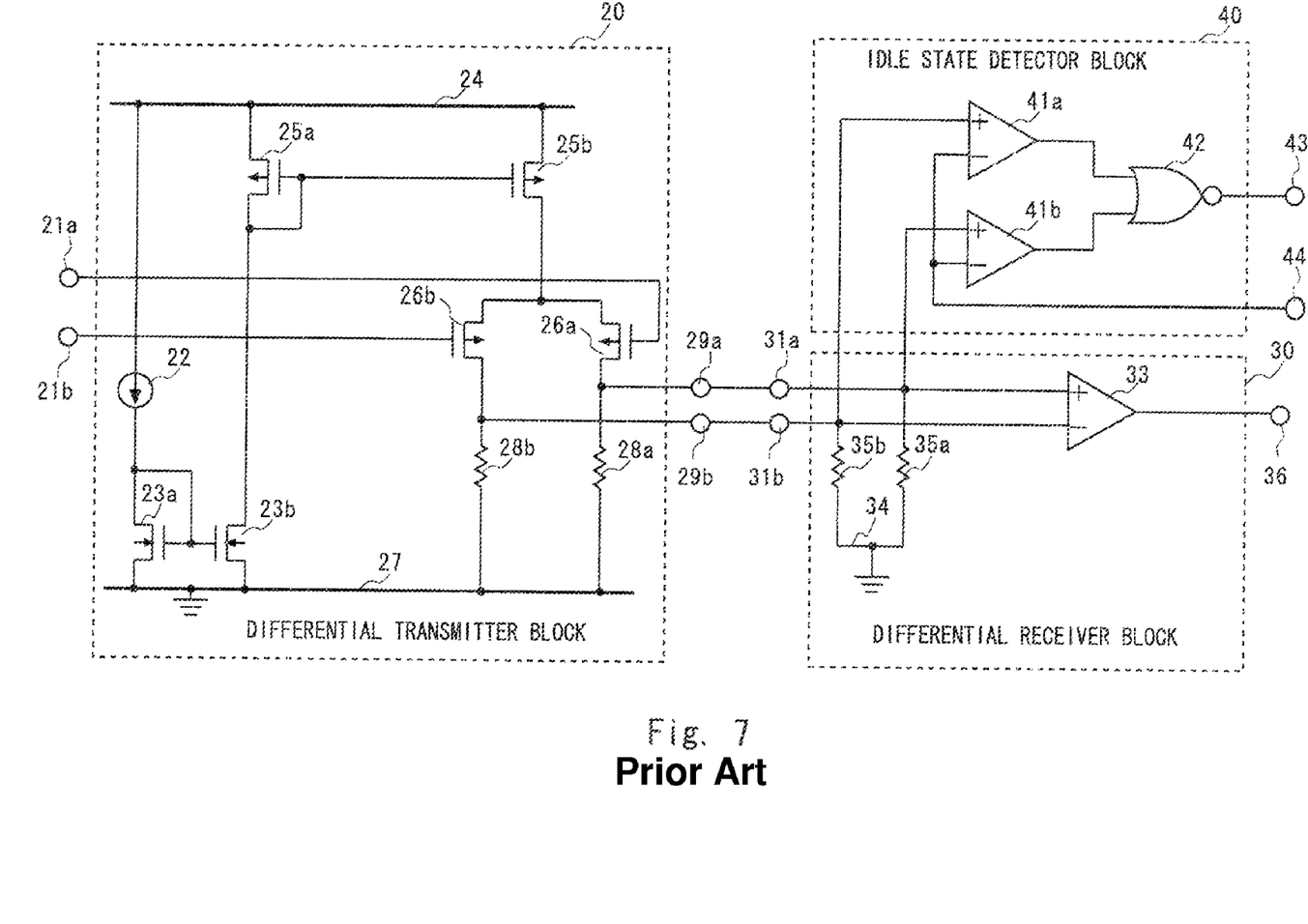
FIG. 7 is a diagram showing a related differential transceiver (No. 1)

FIG. 7 shows an example of a differential transceiver having terminating resistors provided therein. The differential transceiver includes a differential transmitter block 20, a differential receiver block 30, and an idle state detector block 40.

The differential transmitter block 20 includes a constant current source 22, N channel transistors (hereinafter referred to as N transistors) 23a and 23b receiving a constant current from the constant current source 22 to form a mirror circuit, P channel transistors (hereinafter referred to as P transistors) 25a and 25b connected to a power line 24 to form a constant current source, P transistors 26a and 26b functioning as switches for logic output, and terminating resistors 28a and 28b connected to a ground line 27.

The P transistors 26a and 26b include gates connected to input terminals 21a and 21b, respectively, and drains connected to the terminating resistors 28a and 28b, respectively. Further, sources of the P transistors 26a and 26b are connected to the drain of the P transistor 25b, and the output terminals 29a and 29b are connected between the P transistor 26a and the terminating resistor 28a, and between the P transistor 26b and the terminating resistor 28b, respectively. Differential logic signals inside an LSI ARE input through the input terminals 21a and 21b, and voltage values determined by current values flowing in the P transistors 26a and 26b and resistance values of the terminating resistors 28a and 28b are output from the output terminals 29a and 29b as logic amplitude.

The differential receiver block 30 includes a differential comparator 33, and terminating resistors 35a and 35b connected between two inputs of the differential comparator 33 and a ground line 34. The differential outputs from the output terminals 29a and 29b of the differential transmitter block 20 are input to the differential comparator 33 through the input terminals 31a and 31b, and the logic signal determined by the difference of the symbols is output from an output terminal 36.

The idle state detector block 40 includes a pair of differential comparators 41a and 41b, and a logic NOR circuit 42 to which the outputs of the differential comparators 41a and 41b are input. Positive logic input sides of the differential comparators 41a and 41b are connected to the input terminals 31a and 31b, respectively, and negative logic input sides thereof are connected to a reference voltage input terminal 44 to which the reference voltage for determining idle state is input.

The idle state detector block 40 thus configured compares the signal levels of the input terminals 31a and 31b with the reference voltage, and determines that there is no data transmission and reception performed between the differential transmitter block 20 and the differential receiver block 30, which means the differential transceiver is in the idle state on a condition that any signal level of the input terminals is lower than the reference voltage, so as to output the Hi logic output indicating it from a determination terminal 43.

In the differential transceiver including the terminating resistor provided therein, if the logic output in the transmitting side (differential transmitter block 20 side) is fixed when there is no data transmitted or received, current is consumed constantly due to the presence of the terminating resistor. According to the differential transceiver shown in FIG. 7, it is possible to prevent power consumption in the idle state by turning off the P transistors 26a and 26b and setting the output to Hi-Z (high impedance) state when there is no data transmitted or received.

Further, since the discharge is generated through the terminating resistors in the transmitting and receiving sides in the idle state, any signal level of the input terminals 31a and 31b is Low. In this case, the receiving side (differential receiver block 30 side) may respond to small potential difference due to the influence of the noise in the actual operation and may accidentally receive the signal. In the differential transceiver shown in FIG. 7, it is possible to prevent accidental receiving of the signal at the receiving side by detecting the idle state which is different from the normal transmitting or receiving state of the data by the idle state detector block 40.

Figure 8:
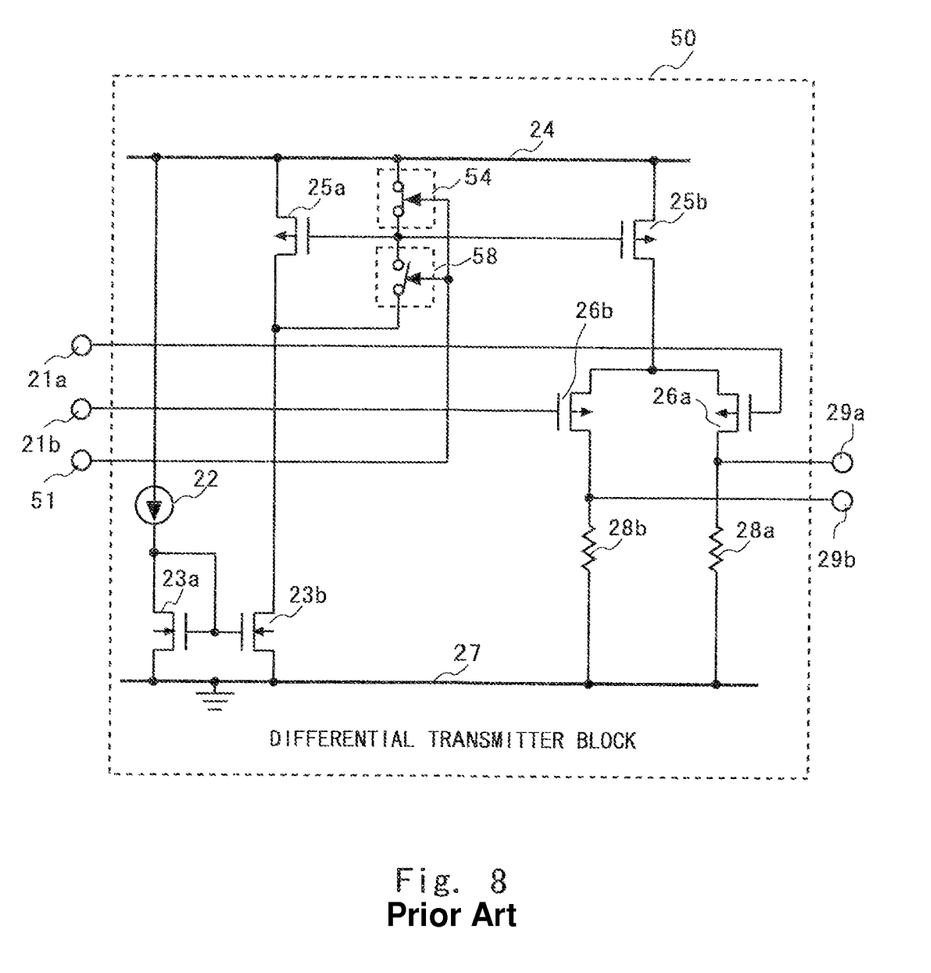
FIG. 8 is a diagram showing a related differential transceiver (No. 2)

FIG. 8 shows another example of the transmitting side of the differential transceiver including the terminating resistors. Note that the same components as those of the differential transceiver shown in FIG. 7 are denoted by the same symbols, and the overlapping description thereof will be omitted.

As shown in FIG. 8, a differential transmitter block 50 includes a switch 54 capable of turning on or off the connection between the power line 24 and the gate of the P transistor 25b forming the constant current source, and a switch 58 capable of turning on or off the connection between the gate of the P transistor 25a, and the drain of the p transistor 25a and the N transistor 23b. These two switches are controlled to be turned on or off complementarily by a control signal from a control terminal 51. More specifically, the switch 54 is turned off and the switch 58 is turned on when the data is transmitted, whereas the switch 54 is turned on and the switch 58 is turned off in the idle state. Accordingly, the P transistor 25b which is the driver current source is turned off and the current flowing in the P transistors 26a and 26b reduces in the idle state. Hence, the power consumption in the terminating resistor in the idle state can be reduced.

Figure 9:
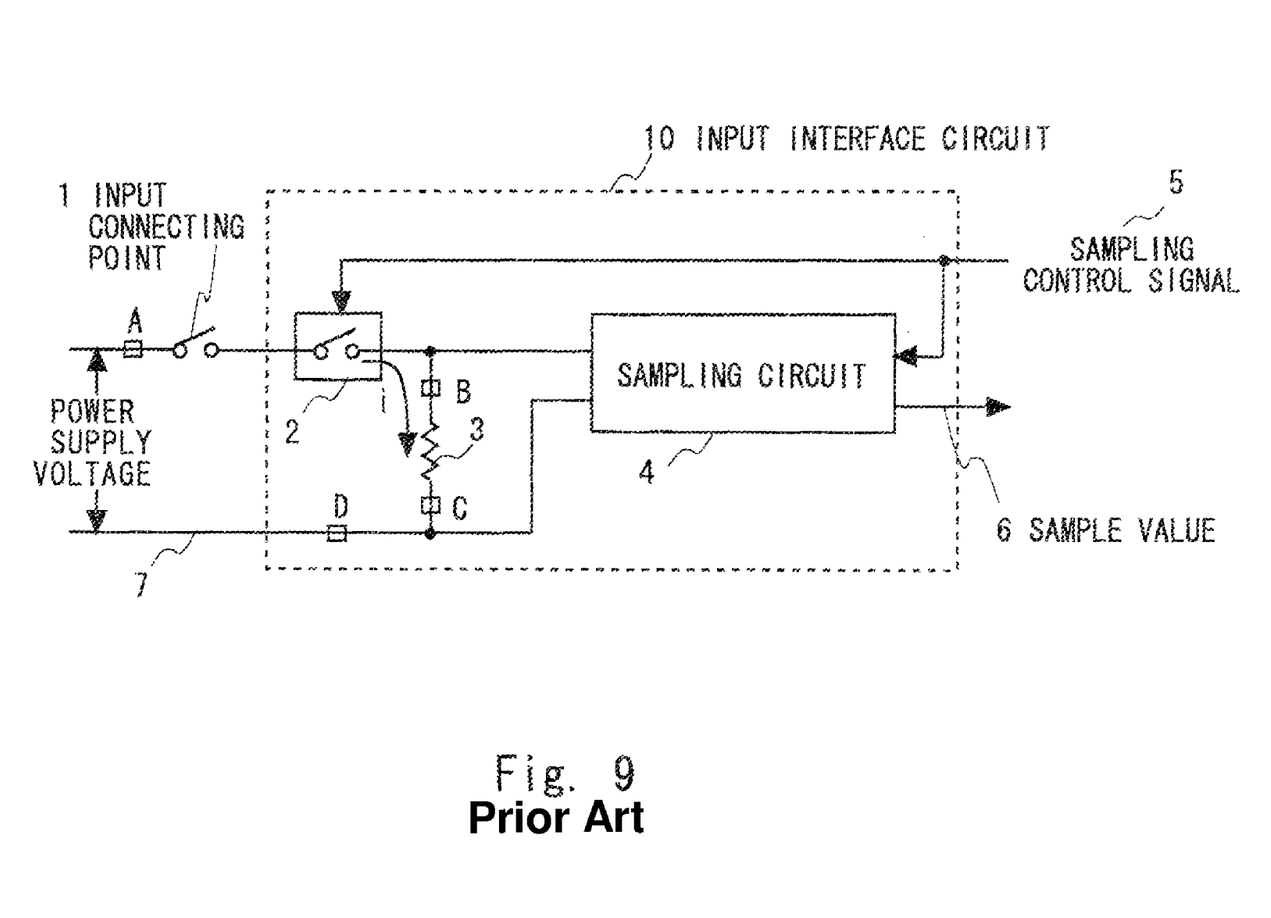
FIG. 9 is a diagram showing an example of a related technique disconnecting a terminating resistor in an idle state.

Japanese Unexamined Patent Application Publication No. 10-209830 discloses a technique for reducing power consumption by disconnecting a terminating resistor in the idle state. In FIG. 9, a symbol 7 is added to the ground line with respect to FIG. 1 of Japanese Unexamined Patent Application Publication No. 10-209830, and the technique thereof will be described with reference to FIG. 9.

An input interface circuit 10 shown in FIG. 9 includes a sampling circuit 4 sampling a signal from an input connecting point 1, and a terminating resistor 3. Further, a switching element 2 whose ON/OFF is controlled by a sampling control signal 5 is provided between the sampling circuit 4 or the terminating resistor 3 and the input connecting point. A power supply voltage is applied to the sampling circuit 4 through the input connecting point 1 and the switching element 2. Since the input impedance of the sampling circuit 4 is normally a large value, most of the current i flowing in the input connecting point 1 and the switching element 2 flows in the terminating resistor 3. Accordingly, the current i flowing in the input connecting point and the switching element 2 is determined by a resistance value of the terminating resistor 3. The sampling circuit 4 performs sampling on the voltage applied according to the sampling control signal 5, so as to detect ON/OFF of the input connecting point 1. When the input connecting point 1 is in ON state, the power supply voltage is applied to the input of the sampling circuit 4, so that the sampling circuit 4 outputs Hi level signal as the sampling value 6. When the input connecting point is in OFF state, the power supply voltage is not applied to the input of the sampling circuit 4, so that the sampling circuit 4 outputs the Low level signal as the sampling value 6. The switching element 2 is turned on when the sampling control signal 5 is input in accordance with the sampling control signal 5, and is otherwise turned off. Accordingly, the switching element 2 is turned on and the current flows only when the sampling circuit 4 performs sampling, and otherwise the switching element 2 is in OFF state and the current does not flow. According to this configuration, the power consumed in the terminating resistor 3 can be reduced.

In recent years, the volume of the data has become larger and the transmission speed has been increased. Accordingly, there is a growing demand to reduce power consumption of the transceiver. For example, the memory modules have been connected to each other by a plurality of lanes in order to transmit large volumes of data in higher speed. In case of the FB-DIMM, it is required by the standard to connect high-speed serial interface in parallel to connect adjacent modules by 24 lanes. In a transmission path having a terminating resistor provided for impedance matching in each lane, power consumption of the terminating resistor increases as the number of lanes increases, which requires further reduce of the power consumption of the terminating resistor in the idle state.

In the differential transceiver shown in FIG. 7, the output of the differential transmitter block 20 is in Hi-Z state in the idle state, so as to reduce power consumption of the terminating resistor. Accordingly, the signal levels of the two output terminals of the differential transmitter block 20 are Low in the idle state, which requires a reference voltage for detecting the idle state to prevent the false reception. Since there is a need to determine the idle state by fully considering a noise margin in order to correspond to the signal having small amplitude, this reference voltage needs to be highly accurate and constant value without being influenced by power supply fluctuation or temperature fluctuation. Therefore, a dedicated analog circuit for generating the reference voltage needs to be provided, which complicates the circuit design and increases the layout area.

In the differential transmitter block 50 shown in FIG. 8, the power consumption of the terminating resistor is reduced by reducing the current flowing in the P transistors 26a and 26b in the idle state. At this time, the differential transmitter block 50 is in the Hi-Z output state. Accordingly, as in the differential transceiver shown in FIG. 7, the reference voltage for detecting the idle state at the receiving side is required, which also causes the problem as described above.

In the input interface circuit 10 shown in FIG. 9, it is possible to reduce the power consumed at the terminating resistor 3 in the idle state. At this time, the input level to the sampling circuit 4 is in the level of the ground line 7, which means that the idle state and the logic "0" state of the signal input to the input interface 10 cannot be determined by the sampling value 6.

SUMMARY

According to one aspect of the present invention, there is provided a differential transmitter. The differential transmitter includes a transmitting side signal transmitter outputting differential output signals in accordance with differential input signals which are input, a pair of output terminals outputting the differential output signals from the transmitting side signal transmitter, a pair of transmitting side terminating resistors, each of which being connected in parallel between the transmitting side signal transmitter and the pair of output terminals, and a transmitting side terminating resistor connection controller disconnecting the pair of transmitting side terminating resistors from the transmitting side signal transmitter in an idle state where logic data fixed as the differential input signals are input.

According to another aspect of the present invention, there is provided a differential receiver. This differential receiver includes a pair of input terminals, a receiving side signal transmitter outputting a logic signal determined by symbols of differential signals input from the pair of input terminals, a pair of receiving side terminating resistors, each of which being connected in parallel between the pair of input terminals and the receiving side signal transmitter, a receiving side terminating resistor connection controller capable of disconnecting the pair of receiving side terminating resistors from the receiving side signal transmitter, and an operating state detector. The operating state detector detects an idle state upon detection that time successively outputting a predetermined logic by the receiving side signal transmitter reaches a predetermined time, and controls the receiving side terminating resistor connection controller so as to disconnect the pair of receiving side terminating resistors from the receiving side signal transmitter upon detection of the idle state.

According to further aspect of the present invention, there is provided a signal transmitter including the above-described differential transmitter and differential receiver. In this signal transmitter, the above-described differential transmitter and differential receiver are applied as the differential transmitter and the differential receiver.

According to further aspect of the present invention, there is provided a signal transmitting system including a plurality of signal transmission lanes and an idle state detector. Each signal transmission lane includes a differential transmitter and a differential receiver, and the above-described differential transmitter is applied as the differential transmitter. The differential receiver includes a pair of input terminals to which the differential output signals from the differential transmitter are input, a receiving side signal transmitter outputting a logic signal determined by symbols of the differential outputs input from the pair of input terminals, a pair of receiving side terminating resistors, each of which being connected in parallel between the pair of input terminals and the receiving side signal transmitter, and a switch controller capable of disconnecting the pair of receiving side terminating resistors from the receiving side signal transmitter. The idle state detector includes a signal output circuit for idle state detection outputting a signal for idle state detection on a condition that each logic signal output from each differential receiver of each signal transmission lane outputs the same predetermined logic, and a receiving side terminating resistor disconnection controller detecting the idle state by detecting that time successively outputting the signal for idle detection reaches a predetermined time by the signal output circuit for idle state detection, and controlling the switch controller of the differential receiver in each signal lane to disconnect the pair of receiving side terminating resistors from the receiving side signal transmitter upon detection of the idle state.

Even when the above-described aspects are combined with each other, or each aspect is replaced with a method, it can still be regarded as the aspect of the present invention.

According to the technique of the present invention, it is possible to reduce power consumption and to realize the signal transmitter which can be easily designed.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

The embodiments of the present invention will be described in detail with reference to the drawings.

First Embodiment

Figure 1:
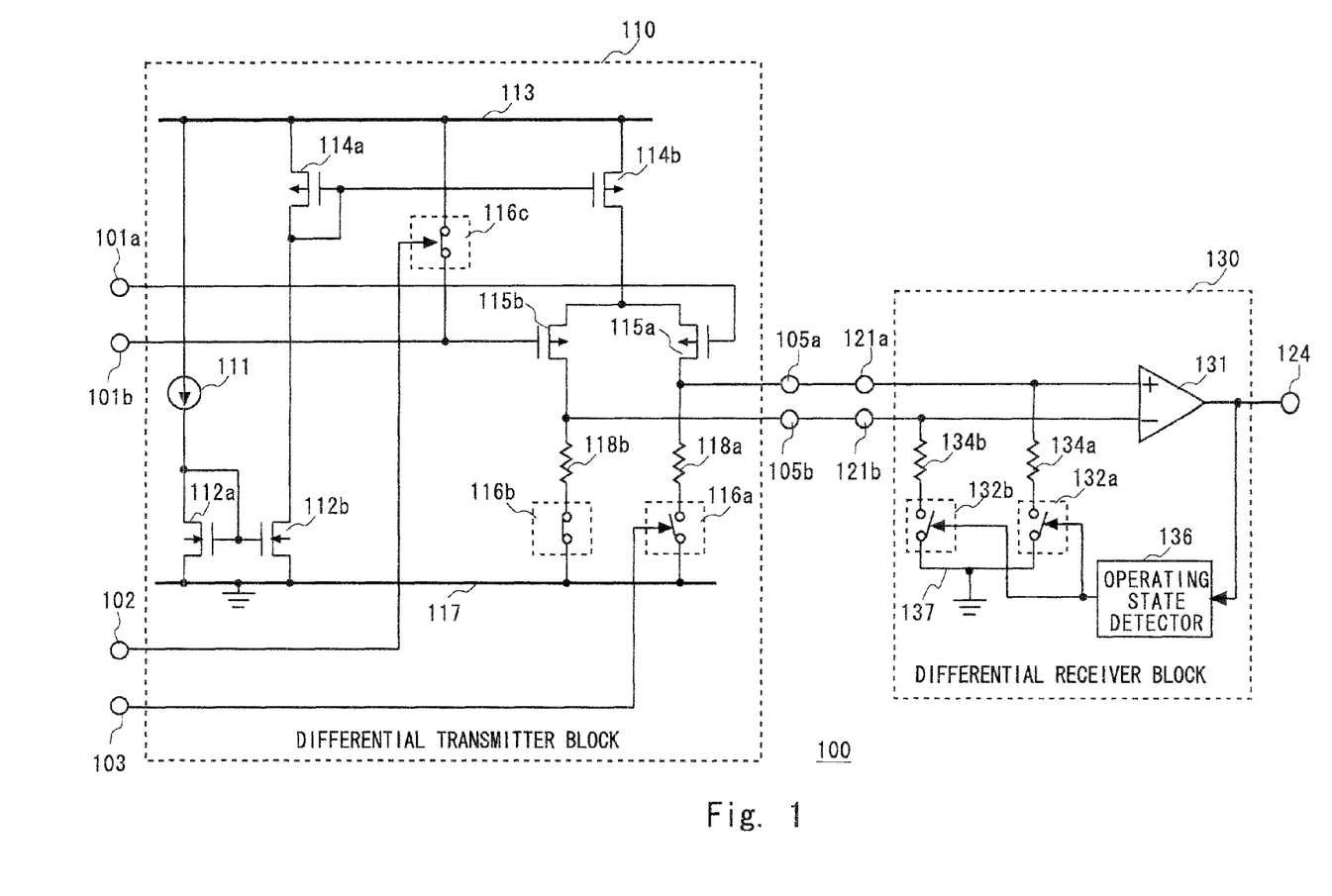
FIG. 1 is a diagram showing a differential transceiver according to a first embodiment of the present invention.

FIG. 1 shows a differential transceiver 100 according to the first embodiment of the present invention. The differential transceiver 100 includes a differential transmitter block 110 in a current driver side, and a differential receiver block 130.

The differential transmitter block 110 includes a constant current source 111, N transistors 112a and 112b receiving a constant current from the constant current source 111 to form a mirror circuit, P transistors 114a and 114b connected to a power line 113 to form a constant current source, P transistors 115a and 115b functioning as switches for logic output, and terminating resistors 118a and 118b connected to a ground line 117. Further, there is a switch 116a provided between the terminating resistor 118a and the ground line 117. On/Off of the switch 116a is controlled by a control signal from a control terminal 103. Additionally, there is a switch 116b provided between the terminating resistor 118b and the ground line 117, and there is a switch 116c provided between a gate of the P transistor 115b and the power line 113. On/Off of the switch 116c is controlled by a control signal from the control terminal 102. The switches 116a to 116c function as a transmitting side terminating resistor connection controller in the claims, and other elements than the terminating resistors function as a transmitting side signal transmitter in the claims.

The P transistors 115a and 115b include gates connected to input terminals 101a and 101b, respectively, and drains connected to the terminating resistors 118a and 118b, respectively. Further, sources of the P transistors 115a and 115b are connected to a drain of the P transistor 114b, and the output terminals 105a and 105b are connected between the P transistor 115a and the terminating resistor 118a and between the P transistor 115b and the terminating resistor 118b, respectively. Differential logic signals inside an LSI are input through the input terminals 101a and 101b, and voltage values determined by current values flowing in the P transistors 115a and 115b and resistance values of the terminating resistors 118a and 118b are output from the output terminals 105a and 105b as logic amplitude.

The differential receiver block 130 includes a differential comparator 131, switches 132a and 132b, terminating resistors 134a and 134b, and an operating state detector 136. The terminating resistor 134a is provided between a positive logic input side of the differential comparator 131 and a ground line 137. The terminating resistor 134a is connected to the ground line 137 when the switch 132a is in ON state, and is disconnected from the ground line 137 when the switch 132a is in OFF state. The terminating resistor 134b is provided between a negative logic input side of the differential comparator 131 and the ground line 137. The terminating resistor 134b is connected to the ground line 137 when the switch 132b is in ON state, and is disconnected from the ground line 137 when the switch 132b is in OFF state. Note that the switches 132a and 132b function as a receiving side terminating resistor connection controller in the claims, and other elements than the terminating resistors and the operating state detector 136 function as a receiving side signal transmitter in the claims.

The differential signals received through the input terminals 121a and 121b from the output terminals 105a and 105b are input to the differential comparator 131, and the differential comparator 131 outputs from the output terminal 124 the logic signal (Hi or Low) determined by symbols of the differential signals.

The operating state detector 136 detects the operating state of the differential transceiver 100 from the output of the differential comparator 131, and controls ON/OFF of the switches 132a and 132b based on the detection result.

Figure 2:
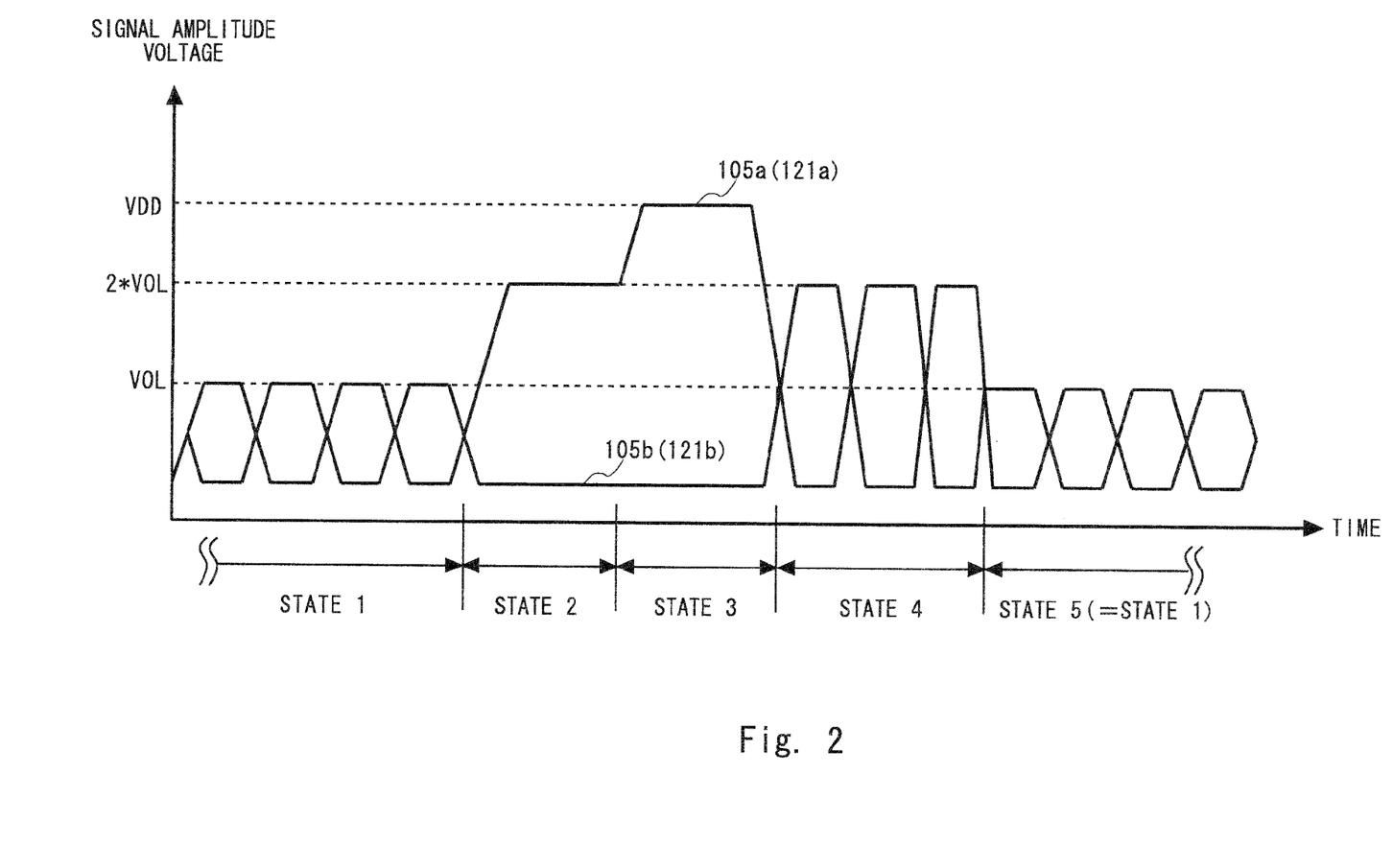
FIG. 2 is a diagram showing an aspect of an amplitude voltage of an output signal of a differential transceiver block in the differential transceiver shown in FIG. 1.
Figure 3:
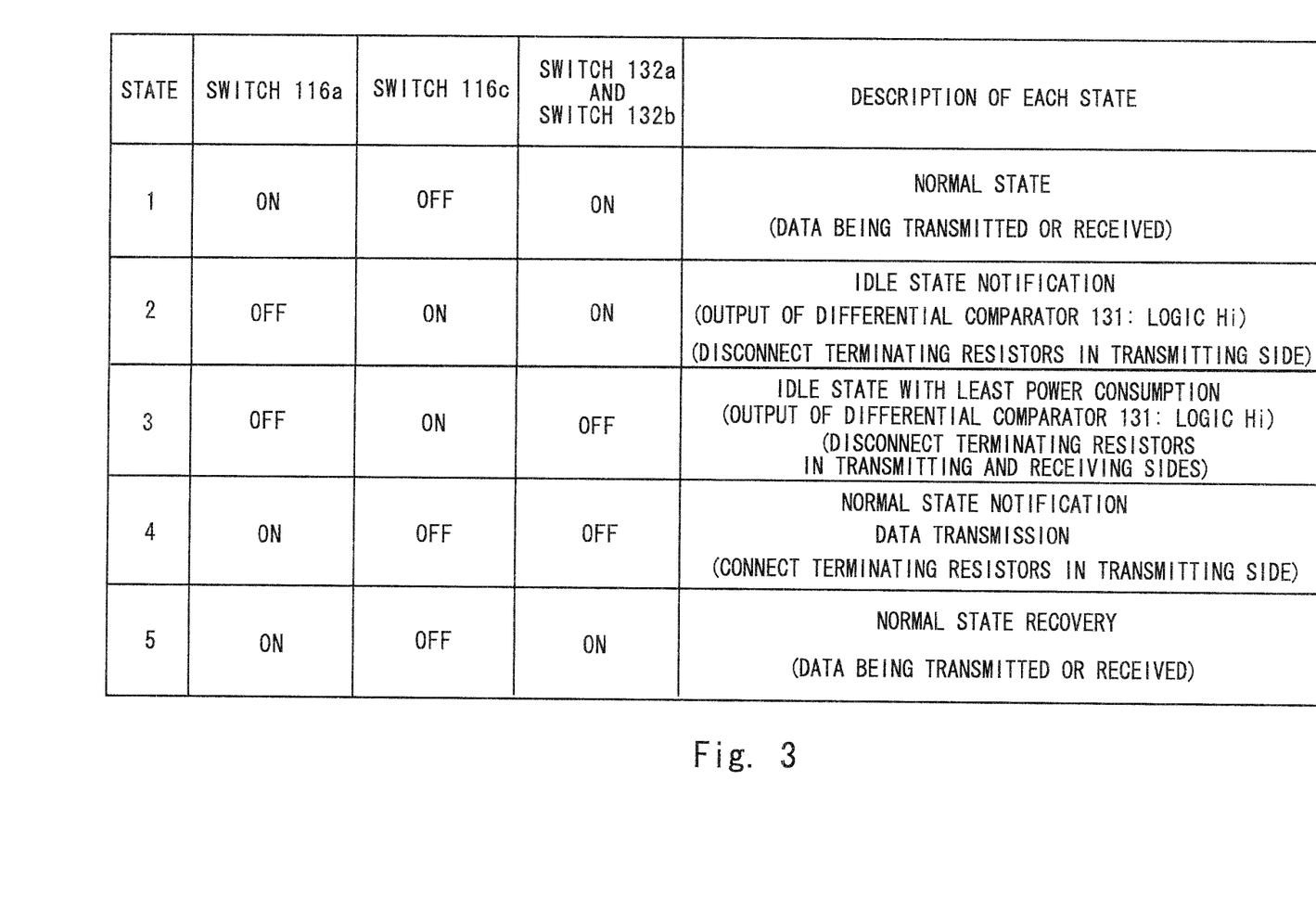
FIG. 3 is a diagram explaining five states assumed in the differential transceiver shown in FIG. 1.

Now, with reference to FIGS. 2 and 3, the detailed operation of each function block of the differential transceiver 100 will be described.

The differential transceiver 100 can assume five states. FIG. 2 shows an aspect of the output of the differential transmitter block 110 (signal levels of the output terminal 105a and the input terminal 121a, and signal levels of the output terminal 105b and the input terminal 121b) in each state of the differential transceiver 100. FIG. 3 shows a description of each state of the differential transceiver 100, and the ON/OFF aspect of the switches 116a and 116c and the switches 132a and 132b in each state. Note that the ON/OFF of the switch 116a is controlled by the control signal from the control terminal 103, the ON/OFF of the switch 116c is controlled by the control signal from the control terminal 102, and the ON/OFF of the switches 132a and 132b is controlled by the operating state detector 136 as described above.

Note that the switch 116b is in ON state in any five state of the differential transceiver 100.

The state 1 of the differential transceiver 100 is the state in which normal data transmission or reception is being performed, and hereinafter this state is also called normal state. As shown in FIG. 3, in this state, the switch 116a is in ON state, the switch 116c is in OFF state, and the switches 132a and 132b are in ON state. Since the switches 116a and 116b are in ON state in the transmitting side, the terminating resistors 118a and 118b are connected to the ground line 117. Since the switches 132a and 132b are in ON state in the receiving side, the terminating resistors 134a and 134b are connected to the ground line 137. Further, since the switch 116c is in OFF state, the P transistor 115b is in the state capable of operating the switch in accordance with the input terminal 101b. Accordingly, the data is output from the differential transmitter block 110 and is received by the differential receiver block 130. As shown in FIG. 2, in this state, the output of the differential transmitter block 110, which is the signal amplitude voltage of the data that is to be transmitted or received is in VOL state which is the normal state.

The state 2 is the state notifying the idle state when the state is transited from the state 1 to the idle state. As shown in FIG. 3, in this state, the switch 116a is in OFF state, the switch 116c is in ON state, and the switches 132a and 132b are in ON state. Further in this state, the Low level signal is input from the input terminal 101a.

Since the Low level signal is input from the input terminal 101a in the transmitting side, the P transistor 115a is in ON state. Further, since the switch 116a is in OFF state, the terminating resistor 118a is disconnected and the signal level of the output terminal 105a is in Hi level. On the other hand, since the switch 116c is in ON state, the gate of the P transistor 115b is clamped up to the power supply voltage, and the P transistor 115b is in OFF state. Further, since the switch 116b is in ON state, the signal level of the output terminal 105b is in Low state. Note that the terminating resistors 118a and 118b do not consume the power since both of the P transistor 115b and the switch 116a are in OFF state.

Since the signal level of the input terminal 121a is in Hi state and the signal level of the input terminal 121b is in Low state in the receiving side, the output from the differential comparator 131 is fixed to the Hi logic state. Further, since the switches 132a and 132b are in ON state, the terminating resistors 134a and 134b are connected to the ground line 137. Accordingly, the amplitude voltage of the output signal of the differential transmitter block 110 is 2*VOL, which is twice larger than that of the normal state, as shown in FIG. 2.

In the present embodiment, the operating state detector 136 detects that the differential transceiver 100 is in the idle state on a condition that the output of the differential comparator 131 has been in Hi logic state for a predetermined period of time. Upon detection of the idle state, the operating state detector 136 controls the switches 132a and 132b to be turned off. Accordingly, the differential transceiver 100 transits to the state 3.

In the state 3, the switch 116a is in OFF state, the switch 116c is in ON state, and the switches 132a and 132b are in OFF state. Further, the Low level signal is input from the input terminal 101a. Since the switches 132a and 132b are in OFF state, the terminating resistors in the receiving side are also disconnected. Accordingly, in the state 3, the signal level of the output terminal 105a of the differential transmitter block 110 increases up to the power supply voltage VDD as shown in FIG. 2. Note that the terminating resistors 134a and 134b in the receiving side do not consume the current in addition to the terminating resistors 118a and 118b in the transmitting side in this state.

The state 4 is the state notifying the transition from the state 3 to the normal state or the state 1. As shown in FIG. 3, in this state, the switch 116a is in ON state, the switch 116c is in OFF State, and the switches 132a and 132b are in OFF state. Since the switch 116c is in OFF state, the P transistor 115b is in the state capable of performing switching operation in accordance with the input terminal 101b. Further, the terminating resistors 118a and 118b in the transmitting side are connected to the ground line 117, and since the terminating resistors 134a and 134b in the receiving side are disconnected, the amplitude voltage of the output signal of the differential transmitter block 110 is 2*VOL, which is twice larger than that of the normal state. Hence, the output of the differential comparator 131 transits from the Hi logic to the Low logic.

The operating state detector 136 controls the switches 132a and 132b to be turned on upon detection of falling of the output of the differential comparator 131. Accordingly, both of the terminating resistors of the transmitting side and the receiving side are connected to the ground line. The differential transceiver 100 is in the state 5 which shows a recovery to the normal state, and the amplitude voltage of the output signal of the differential transmitter block 110 is in VOL state which is the normal state. Note that the state 5 is the normal state, which is the same as the state 1.

In the differential transceiver 100 of the present embodiment, the terminating resistors of the transmitting and receiving sides are disconnected in the idle state. Accordingly, it is possible to reduce power consumption of the terminating resistor in the idle state.

Further, since the transition from the normal state to the idle state is notified by fixing two outputs of the differential transmitter block 110 to Hi and Low, the operating state detector 136 is able to detect the idle state on a condition that the output of the differential comparator 131 has been in Hi logic state for a predetermined period of time. Therefore, the reference voltage detecting the idle state is not required unlike the related technique shown in FIGS. 7 and 8, whereby it is possible to simplify the circuit design, and to decrease the circuit size.

Further, in the differential transceiver shown in FIG. 8, the P transistor 25b which is the driver current source is in OFF state in the idle state so as to reduce power consumption of the terminating resistors. Since the constant current source is controlled in an analog form, once the P transistor 25b is turned off, it takes time for the gate voltage of the P transistor 25b to be stable when the state is transited from the idle state to the normal state, which means that the system standard where the high speed operation is required cannot be satisfied. On the other hand, in the differential transceiver 100 of the present embodiment, the power consumption in the idle state is reduced without turning off the P transistor 114b forming the driver current source. Accordingly, it is possible to transit the state from the idle state to the normal state.

The signal amplitude may not be stable immediately after the state is transited from the idle state to the normal state because of the influence of the transmission delay due to the connection timing of the terminating resistors. However, since the recent receiver normally includes a CDR (Clock Data Recovery) function for constantly receiving the data, it is possible to readily prevent instability of the signal amplitude immediately after the recovery if only a training pattern or a synchronizing pattern is inserted as the input signal immediately after the recovery.

In the first embodiment, the driver current source is formed by the P transistors 114a and 114b as an example so as to connect the terminating resistors to the ground line. However, it is also possible to form the driver current source by the N transistor to connect the terminating resistors to the power line. In this case, all the power lines are replaced with the ground lines and the ground lines are replaced with the power lines, and at the same time, all the P transistors are replaced with the N transistors and the N transistors are replaced with the P transistors in FIG. 1.

Further, since the input signal (corresponding to the signals from the input terminals 101a and 101b in the differential transceiver 100) does not fully swing to the power supply voltage level in the general differential circuit, it is impossible to completely turn off the P transistor 115b functioning as the switch of the output in the idle state. On the other hand, in the present embodiment, there is provided a switch 116c, and the switch 116c is turned on in the idle state. Hence the gate voltage of the P transistor 115b is clamped up to the power supply voltage, so as to completely turn off the P transistor 115b, whereby the power consumption of the terminating resistor 118b in the idle state can be avoided.

Second Embodiment

Figure 4:
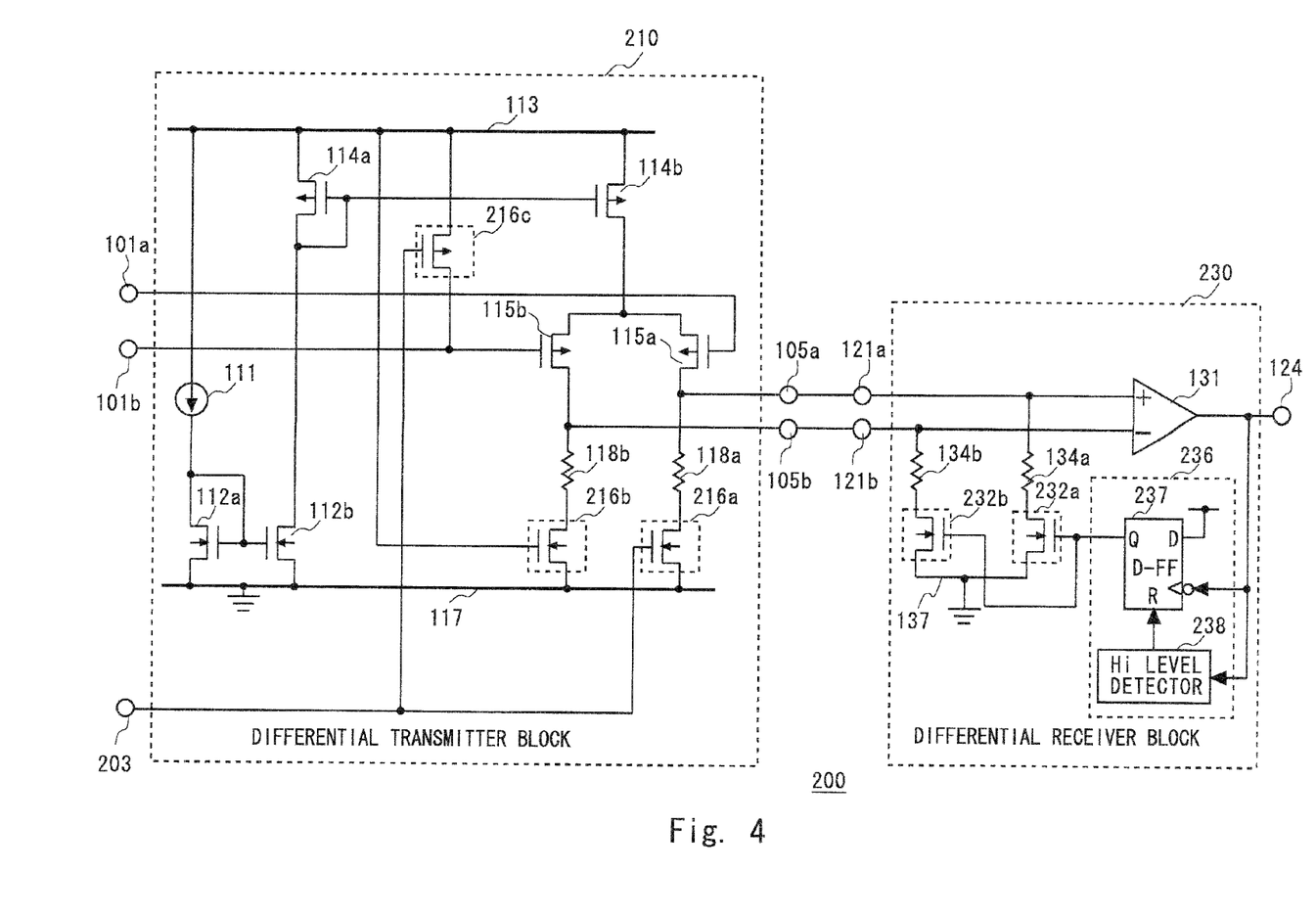
FIG. 4 is a diagram showing a differential transceiver according to a second embodiment of the present invention.

FIG. 4 shows a differential transceiver 200 according to the second embodiment of the present invention. The differential transceiver 200 specifically shows the details of the operating state detector 136 and switches of the differential transceiver 100 of the first embodiment. In FIG. 4, the same components as those of the differential transceiver 100 are denoted by the same reference symbols except the operating state detector 136 and switches, and the overlapping description thereof will be omitted. Further, the differential transceiver 200 shown in FIG. 4 can also assume five states of state 1 to state 5 as in the same way as the differential transceiver 100 shown in FIG. 1.

As shown in FIG. 4, in the differential transmitter block 210 of the differential transceiver 200, an N transistor 216a is provided between the terminating resistor 118a and the ground line 117, an N transistor 216b is provided between the terminating resistor 118b and the ground line 117, and a P transistor 216c is provided between the P transistor 115b and the power line 113.

The N transistor 216a includes a gate connected to a control terminal 203, a source connected to the ground line 117, and a drain connected to the terminating resistor 118a. The N transistor 216a is in ON state when the control signal from the control terminal 203 is Hi, and is in OFF state when the control signal is Low. In other words, the N transistor 216a corresponds to the switch 116a in the differential transceiver 100. The N transistor 216a is turned on upon input of the control signal of Hi from the control terminal 203 in the state 1 (normal state), the state 4 (normal state notification), and the state 5 (normal state recovery), and is turned off upon input of the control signal of Low from the control terminal 203 in the state 2 (idle state notification) and the state 3 (idle state with least power consumption).

The N transistor 216b corresponds to the switch 116b in the differential transceiver 100. A gate of the N transistor 216b is connected to the power line 113, a source thereof is connected to the ground line 117, and a drain thereof is connected to the terminating resistor 118b. Hence, the N transistor 216b is always in ON state.

The P transistor 216c includes a gate connected to the control terminal 203, a source connected to the power line, and a drain connected to the gate of the P transistor 115b. The P transistor 216c is in OFF state when the control signal from the control terminal 203 is Hi, and is in ON state when the control signal is Low. Hence, the P transistor 216c is turned ON or OFF complementarily with the N transistor 216a, and corresponds to the switch 116c in the differential transceiver 100.

According to this configuration, the differential transmitter block 210 realizes the same function as that of the differential transmitter block 110 in the differential transceiver 100. Further, since the N transistor 216a and the P transistor 216c functioning as the switch are able to share one control terminal 203, the circuit configuration can be made simple.

In the differential receiver block 230, the N transistors 232a and 232b and the operating state detector 236 each corresponds to the switches 132a and 132b and the operating state detector 136 in the differential receiver block 130.

The operating state detector 236 includes a flip-flop circuit (hereinafter referred to as D-FF) 237 and a Hi level detector 238.

The Hi level detector 238 detects that the differential transceiver 200 is in the idle state on the condition that the output of the differential comparator 131 has been in the Hi logic state for the predetermined period of time, and outputs the reset pulse to the D-FF 237. The Hi level detector 238 can be formed by a timer circuit counting the time successively outputting the Hi logic by the differential comparator 131, for example.

The D-FF 237 is an edge-triggered flip-flop circuit, which outputs the Hi logic when the output of the differential comparator 131 is fallen from the Hi logic to the Low logic. As stated above, the time when the output of the differential comparator 131 falls from the Hi logic to the Low logic corresponds to the state 4 (normal state notification). Further, the D-FF 237 outputs the Low logic when the reset pulse is received from the Hi level detector 238.

In summary, the operating state detector 236 outputs the Low logic upon detection of the idle state on the condition that the output of the differential comparator 131 has been in the Hi logic state for the predetermined period of time, and outputs the Hi logic upon detection of the falling of the output of the differential comparator 131 which is the detection of the recovery from the idle state to the normal state.

On/Off of the N transistors 232a and 232b is controlled by the output of the operating state detector 236. The N transistor 232a includes a gate connected to the output of the operating state detector 236, a source connected to the ground line 137, and a drain connected to the terminating resistor 134a. The N transistor 232b includes a gate connected to the output of the operating state detector 236, a source connected to the ground line 137, and a drain connected to the terminating resistor 134b. The N transistors 232a and 232b are in ON state when the Hi logic is output from the operating state detector 236, so as to connect the terminating resistors connected to each of them to the ground line 137. On the other hand, the N transistors 232a and 232b are in OFF state when the Low logic is output from the operating state detector 236, so as to disconnect the terminating resistors connected to each of them.

As stated above, the operating state detector 236 and the N transistors 232a and 232b execute the same functions as those of the operating state detector 136 and the switches 132a and 132b of the differential receiver block 130 in the differential transceiver 100, respectively. Accordingly, the differential receiver block 230 realizes the same function as that of the differential receiver block 130.

According to the differential transceiver 200 of the embodiment of the present invention, it is possible to obtain the same effect as in the differential transceiver 100 shown in FIG. 1.

Third Embodiment

Figure 5:
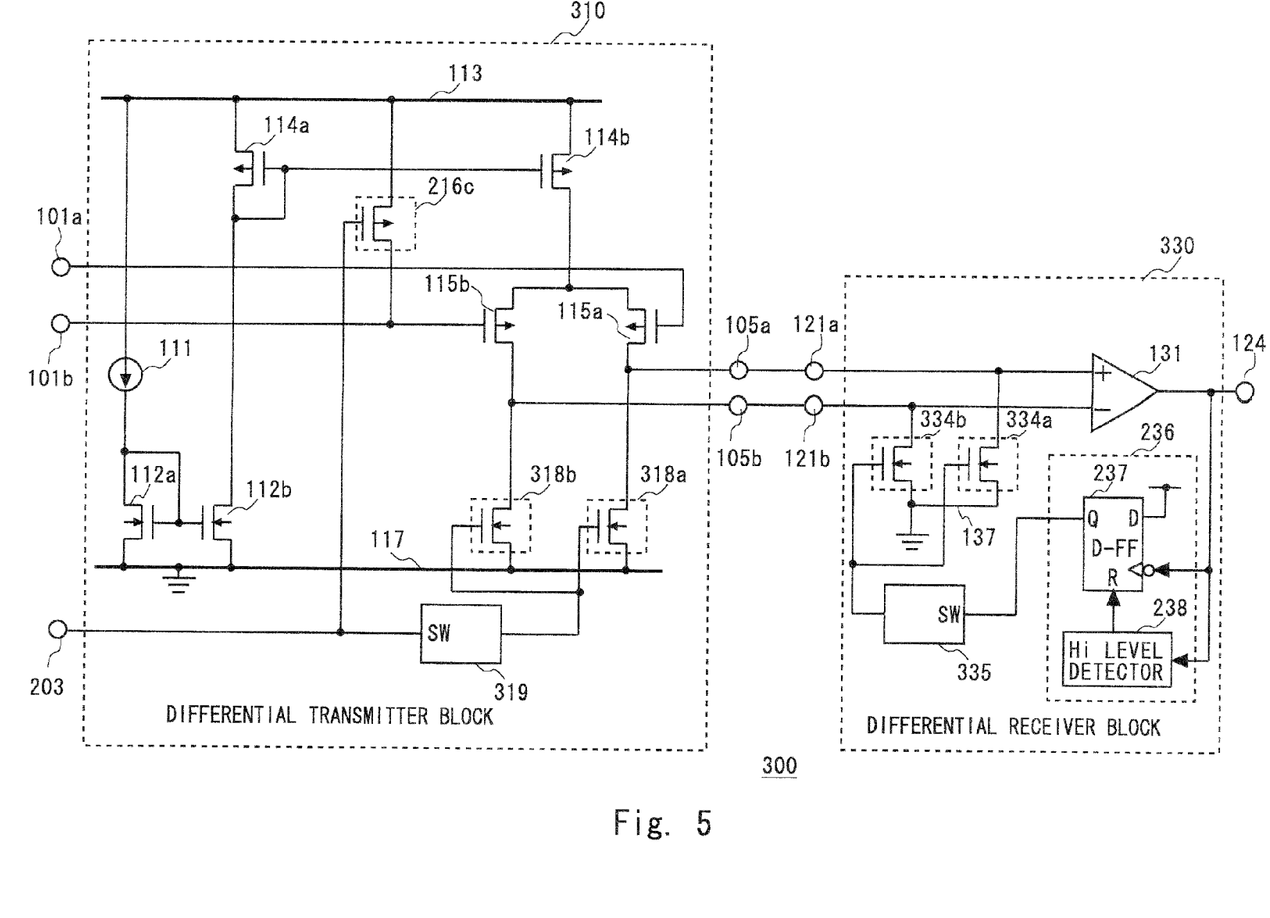
FIG. 5 is a diagram showing a differential transceiver according to a third embodiment of the present invention.

FIG. 5 is a differential transceiver 300 according to the third embodiment of the present invention. In the differential transceiver 300, the terminating resistors and the switches connected thereto are integrated with respect to the differential transceiver 200 shown in FIG. 4 based on the fact that the ON resistance of the transistor is determined by a design of a gate width and a gate length. Other functional components are the same as those of the differential transceiver 200 shown in FIG. 4 except for this point. Therefore, only the terminating resistors in the transmitting and receiving sides and the switches connected thereto are described regarding the differential transceiver 300.

In the differential transmitter block 310 of the differential transceiver 300, the N transistor 318a corresponds to the terminating resistor 118a and the N transistor 216a in the differential transmitter block 210 of the differential transceiver 200, and the N transistor 318b corresponds to the terminating resistor 118b and the N transistor 216b in the differential transmitter block 210 of the differential transceiver 200. The voltage controller 319 applies voltage to the gates of the N transistors 318a and 318b in the analog form according to the control signal from the control terminal 203. More specifically, when the control signal from the control terminal 203 is Hi, which is the state 1 (normal state), the state 4 (normal state notification), and the state 5 (normal state recovery), the voltage controller 319 applies voltage so that the N transistors 318a and 318b are in ON state. Accordingly, the ON resistances of the N transistors 318a and 318b function as the terminating resistors. On the other hand, when the control signal from the control terminal 203 is Low, which is the state 2 (idle state notification) and the state 3 (idle state with least power consumption), the voltage controller 319 applies voltage so that the gate voltages of the N transistors 318a and 318b are in the ground level. Accordingly, the N transistors 318a and 318b are turned off, and the terminating resistors are disconnected.

In the differential receiver block 330, the N transistor 334a corresponds to the terminating resistor 134a and the N transistor 232a in the differential receiver block 230 of the differential transceiver 200, and the N transistor 334b corresponds to the terminating resistor 134b and the N transistor 232b in the differential receiver block 230 of the differential transceiver 200. The voltage controller 335 applies voltage to the gates of the N transistor 334a and the N transistor 334b according to the output of the operating state detector 236 in the analog form. More specifically, when the output of the operating state detector 236 is Hi, the voltage controller 335 applies voltage so that the N transistors 334a and 334b are turned on. Accordingly, the ON resistances of the N transistors 334a and 334b function as the terminating resistors. On the other hand, when the output of the operating state detector 236 is Low, the voltage controller 335 applies voltage so that the gate voltages of the N transistors 334a and 334b are in the ground level. Accordingly, the N transistors 334a and 334b are turned off, and the terminating resistors are disconnected.

According to the differential transceiver 300 of the third embodiment of the present invention, it is possible to obtain the same effect as in the differential transceiver 100 and the differential transceiver 200.

Fourth Embodiment

Figure 6:
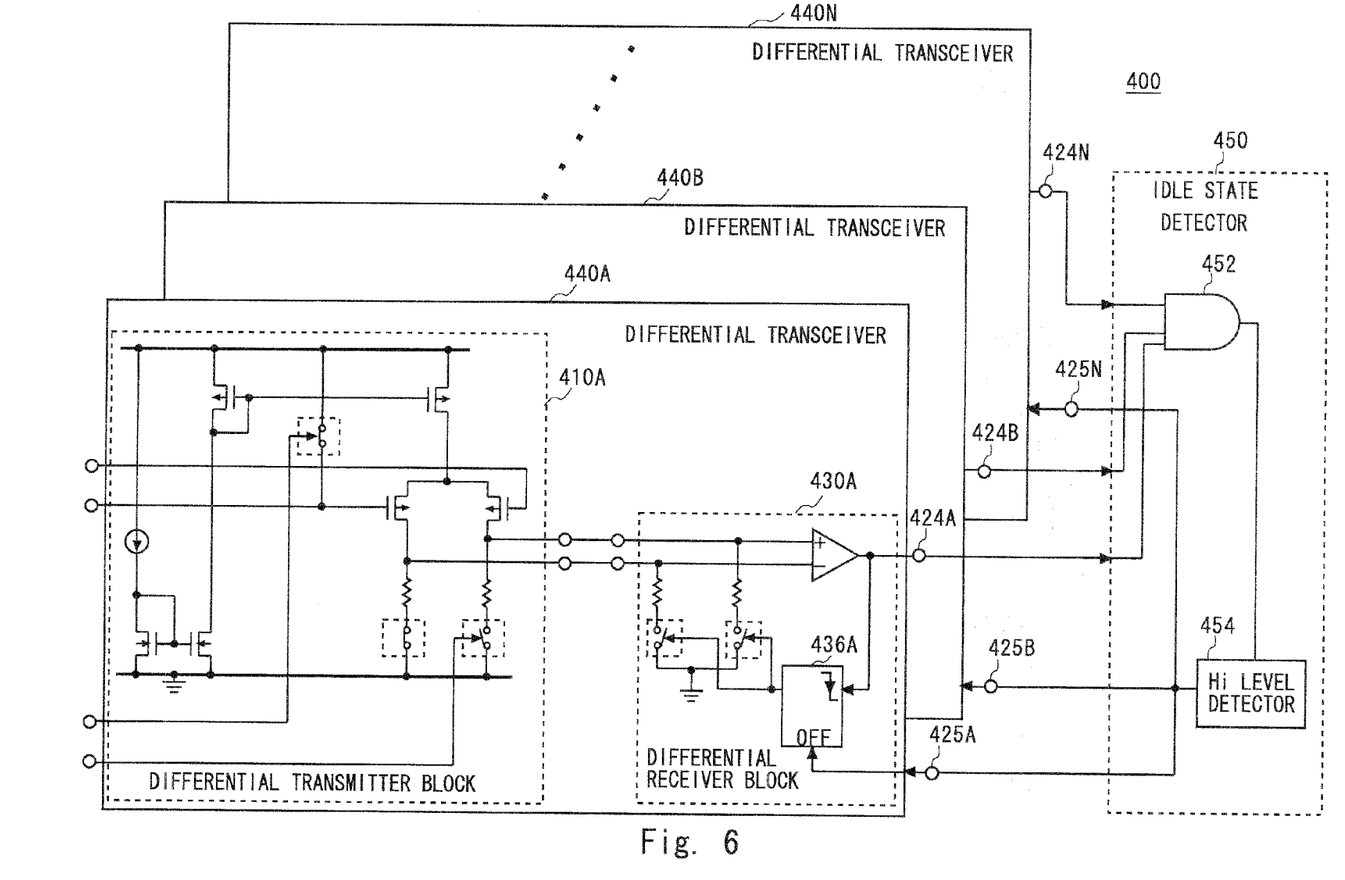
FIG. 6 is a diagram showing a differential transceiver system according to a fourth embodiment of the present invention.

FIG. 6 shows a differential transceiver system 400 according to the fourth embodiment of the present invention. The differential transceiver system 400 includes a plurality of lanes, and one lane includes one differential transceiver. The differential transceiver system 400 further includes an idle state detector 450 detecting that the differential transceiver system 400 is in the idle state in addition to a plurality of differential transceivers 440A to 440N.

Since the differential transceivers 440A to 440N all have the same configurations, only the differential transceiver 440A will be described here.

The differential transceiver 440A includes a differential transmitter block 410A and a differential receiver block 430A. The differential transmitter block 410A may be any differential transmitter block in the differential transceiver of the first to third embodiments above. In FIG. 6, the configuration same to that of the differential transmitter block 110 in the differential transceiver 100 of the first embodiment is shown as an example. In the differential transmitter block 410A, the terminating resistors are connected in the state 1 (normal state), the state 4 (normal state notification), and the state 5 (normal state recovery), and the differential logic signal in the LSI is output to the differential receiver block 430A from both output terminals. The terminating resistors of the differential transmitter block 410A are disconnected in the state 2 (idle state notification). At this time, the signal level in one output terminal is 2*VOL, and the signal level of the other output terminal is the ground voltage level. Further, also in the state 3 (idle notification with least power consumption), the terminating resistors of the differential transmitter block 410A are disconnected and the signal level of the output terminal which is the ground voltage level in the state 2 remains the ground voltage level. However, the signal level of the other output terminal is the power supply voltage VDD by disconnecting the terminating resistors of the differential receiver block 430A which will be described later.

In the differential receiver block 430A, the switch control circuit 436A is provided in place of the operating state detector of the differential receiver block in the differential transceiver of the above first to third embodiments. Other configurations of the differential receiver block 430A are the same as those of the first to third embodiments.

The switch control circuit 436A serves the same function as that of the operation detector of the differential receiver block of the first to third embodiments. More specifically, the switches of the differential receiver block 430A are controlled so that the terminating resistors are connected in the state 1 (normal state), the state 4 (normal state notification), and the state 5 (normal state recovery), and are controlled so that the terminating resistors are disconnected in the state 2 (idle state notification). Further, the switches of the differential receiver block 430A is controlled so that the terminating resistors are disconnected also in the state 3 (idle state with lease power consumption). In order to serve such functions, the switch controller 436A controls the switches so as to connect the terminating resistors upon detection of the falling of the output signal from the differential comparator from the Hi logic to the Low logic in the state 4, and controls the switches so as to disconnect the terminating resistors upon receiving of the signal indicating that the idle state has been detected from the idle state detector 450 (state 2).

As stated above, in the FB-DIMM, the high-speed serial interface is connected in parallel, and the data transmission between memory modules is formed by a transceiver of 24 lanes. In such a system having a plurality of lanes, the detection of the idle state can be performed from higher-order protocol state of the system.

In the present embodiment, the idle state detector 450 detects the idle state of the differential transceiver system 400, and includes a logic AND circuit 452 and a Hi level detector 454. The logic AND circuit 452 functions as a signal output circuit for idle state detection in the claims, and the Hi level detector 454 functions as a receiving side terminating resistor disconnection controller in the claims.

Each output of each differential transceiver, which is the output of the differential receiver block in each differential transceiver, is input to the logic AND circuit 452, where the Hi logic is output only when the outputs of all the differential receiver blocks are in Hi logic state.

The Hi level detector 454 sets the state in which the period successively outputting the Hi logic by the logic AND circuit 452 reaches the predetermined period of time to the idle state, and upon detection of the idle state, the Hi level detector 454 outputs the signal indicating the disconnection of the terminating resistors to the switch control circuit in each differential receiver block.

As stated above, the technique of the present invention can be applied to the differential transceiver system including the plurality of lanes as well, and thus can bring about further effect of each embodiment described above.

It is apparent that the present invention is not limited to the above embodiments, but may be modified and changed without departing from the scope and spirit of the invention.

What is claimed is:

1. A differential transmitter, comprising:
   a transmitting side signal transmitter outputting differential output signals in accordance with differential input signals which are input;
   a pair of output terminals outputting the differential output signals from the transmitting side signal transmitter;
   a pair of transmitting side terminating resistors, each of which being connected in parallel between the transmitting side signal transmitter and the pair of output terminals; and
   a transmitting side terminating resistor connection controller disconnecting the pair of transmitting side terminating resistors from the transmitting side signal transmitter in an idle state where logic data selected as the differential input signals are input,
   wherein the transmitting side signal transmitter includes a differential pair formed by a pair of transistors to output the differential output signal, each of the pair of transmitting side terminating resistors is connected to each of drain sides of a pair of transistors forming the differential pair, and the transmitting side terminating resistor connection controller includes a switch circuit and a clamp circuit, the switch circuit disconnecting one of the transmitting side terminating resistors from the transmitting side signal transmitter in the idle state, and the clamp circuit clamping gate voltage of the transistor connected to the other one of the transmitting side terminating resistors so as to turn OFF the transistor.

2. A differential receiver, comprising:
   a pair of input terminals;
   a receiving side signal transmitter outputting a logic signal determined by symbols of differential signals input from the pair of input terminals;
   a pair of receiving side terminating resistors, each of which being connected in parallel between the pair of input terminals and the receiving side signal transmitter;
   a receiving side terminating resistor connection controller capable of disconnecting the pair of receiving side terminating resistors from the receiving side signal transmitter; and
   an operating state detector detecting an idle state upon detection that time successively outputting a predetermined logic by the receiving side signal transmitter reaches a predetermined time, and controlling the receiving side terminating resistor connection controller to perform the disconnecting of the pair of receiving side terminating resistors from the receiving side signal transmitter upon detection of the idle state,
   wherein the operating state detector includes an edge-triggered flip-flop circuit detecting a change of the output of the receiving side signal transmitter from the predetermined logic to another logic, and the differential receiver controls the receiving side terminating resistor connection controller so as to connect the pair of receiving side terminating resistors to the receiving side signal transmitter upon detection of the change by the flip-flop circuit.

3. The differential receiver according to claim 2, wherein the operating state detector includes a timer circuit for counting time in which the predetermined logic time has continued.

4. A differential receiver, comprising:
   a pair of input terminals;
   a receiving side signal transmitter outputting a logic signal determined by symbols of differential signals input from the pair of input terminals;
   a pair of receiving side terminating resistors, each of which being connected in parallel between the pair of input terminals and the receiving side signal transmitter;
   a receiving side terminating resistor connection controller capable of disconnecting the pair of receiving side terminating resistors from the receiving side signal transmitter; and
   an operating state detector detecting an idle state upon detection that time successively outputting a predetermined logic by the receiving side signal transmitter reaches a predetermined time, and controlling the receiving side terminating resistor connection controller to perform the disconnecting of the pair of receiving side terminating resistors from the receiving side signal transmitter upon detection of the idle state,
   wherein the operating state detector includes a timer circuit for counting time in which the predetermined logic time has continued and an edge-triggered flip-flop circuit detecting a change of the output of the receiving side signal transmitter from the predetermined logic to another logic, and the differential receiver controls the receiving side terminating resistor connection controller so as to connect the pair of receiving side terminating resistors to the receiving side signal transmitter upon detection of the change by the flip-flop circuit.

5. A signal transmitter including a differential transmitter and a differential receiver, wherein the differential transmitter comprises:

a transmitting side signal transmitter outputting differential output signals in accordance with differential input signals which are input;

a pair of output terminals outputting the differential output signals from the transmitting side signal transmitter to the differential receiver;

a pair of transmitting side terminating resistors, each of which being connected in parallel between the transmitting side signal transmitter and the pair of output terminals; and a transmitting side terminating resistor connection controller disconnecting the pair of transmitting side terminating resistors from the transmitting side signal transmitter in an idle state where logic data selected as the differential input signals are input, and the differential receiver comprises:

a pair of input terminals to which the differential output signals from the differential transmitter are input;

a receiving side signal transmitter outputting a logic signal determined by symbols of the differential outputs input from the pair of input terminals;

a pair of receiving side terminating resistors, each of which being connected in parallel between the pair of input terminals and the receiving side signal transmitter;

a receiving side terminating resistor connection controller capable of disconnecting the pair of receiving side terminating resistors from the receiving side signal transmitter; and an operating state detector detecting an idle state upon detection that time successively outputting a predetermined logic by the receiving side signal transmitter reaches a predetermined time, and controlling the receiving side terminating resistor connection controller to perform the disconnecting of the pair of receiving side terminating resistors from the receiving side signal transmitter upon detection of the idle state, wherein the transmitting side signal transmitter includes a differential pair formed by a pair of transistors to output the differential output signal, each of the pair of transmitting side terminating resistors is connected to each of drain sides of a pair of transistors forming the differential pair, and the transmitting side terminating resistor connection controller includes a switch circuit and a clamp circuit, the switch circuit disconnecting one of the transmitting side terminating resistors from the transmitting side signal transmitter in the idle state, and the clamp circuit clamping gate voltage of the transistor connected to the other one of the transmitting side terminating resistors so as to turn OFF the transistor.

6. A signal transmitting system including a plurality of signal transmission lanes and an idle state detector, wherein the signal transmission lane includes a differential transmitter and a differential receiver, and the differential transmitter comprises:

a transmitting side signal transmitter outputting differential output signals in accordance with differential input signals which are input;

a pair of output terminals outputting the differential output signals from the transmitting side signal transmitter to the differential receiver;

a pair of transmitting side terminating resistors, each of which being connected in parallel between the transmitting side signal transmitter and the pair of output terminals; and a transmitting side terminating resistor connection controller disconnecting the pair of transmitting side terminating resistors from the transmitting side signal transmitter in an idle state where logic data selected as the differential input signals are input, and the differential receiver comprises:

a pair of input terminals to which the differential output signals from the differential transmitter are input;

a receiving side signal transmitter outputting a logic signal determined by symbols of the differential outputs input from the pair of input terminals;

a pair of receiving side terminating resistors, each of which being connected in parallel between the pair of input terminals and the receiving side signal transmitter; and a switch controller capable of disconnecting the pair of receiving side terminating resistors from the receiving side signal transmitter, and the idle state detector comprises:

a signal output circuit for idle state detection outputting a signal for idle state detection on a condition that each logic signal output from each differential receiver of each signal transmission lane outputs the same predetermined logic; and a receiving side terminating resistor disconnection controller detecting the idle state by detecting that time successively outputting the signal for idle detection reaches a predetermined time by the signal output circuit for idle state detection, and controlling the switch controller of the differential receiver in each signal lane to performing the disconnecting of the pair of receiving side terminating resistors from the receiving side signal transmitter upon detection of the idle state, and wherein the transmitting side signal transmitter includes a differential pair formed by a pair of transistors to output the differential output signal, each of the pair of transmitting side terminating resistors is connected to each of drain sides of a pair of transistors forming the differential pair, and the transmitting side terminating resistor connection controller includes a switch circuit and a clamp circuit, the switch circuit disconnecting one of the transmitting side terminating resistors from the transmitting side signal transmitter in the idle state, and the clamp circuit clamping gate voltage of the transistor connected to the other one of the transmitting side terminating resistors so as to turn OFF the transistor.

7. A signal transmitter including a differential transmitter and a differential receiver, wherein the differential transmitter comprises:

a transmitting side signal transmitter outputting differential output signals in accordance with differential input signals which are input;

a pair of output terminals outputting the differential output signals from the transmitting side signal transmitter to the differential receiver;

a pair of transmitting side terminating resistors, each of which being connected in parallel between the transmitting side signal transmitter and the pair of output terminals; and a transmitting side terminating resistor connection controller disconnecting the pair of transmitting side terminating resistors from the transmitting side signal transmitter in an idle state where logic data selected as the differential input signals are input, and the differential receiver comprises:

a pair of input terminals to which the differential output signals from the differential transmitter are input;

a receiving side signal transmitter outputting a logic signal determined by symbols of the differential outputs input from the pair of input terminals;

a pair of receiving side terminating resistors, each of which being connected in parallel between the pair of input terminals and the receiving side signal transmitter;

a receiving side terminating resistor connection controller capable of disconnecting the pair of receiving side terminating resistors from the receiving side signal transmitter; and an operating state detector detecting an idle state upon detection that time successively outputting a predetermined logic by the receiving side signal transmitter reaches a predetermined time, and controlling the receiving side terminating resistor connection controller to perform the disconnecting of the pair of receiving side terminating resistors from the receiving side signal transmitter upon detection of the idle state, and wherein the operating state detector includes an edge-triggered flip-flop circuit detecting a change of the output of the receiving side signal transmitter from the predetermined logic to another logic, and the differential receiver controls the receiving side terminating resistor connection controller so as to connect the pair of receiving side terminating resistors to the receiving side signal transmitter upon detection of the change by the flip-flop circuit.

8. A signal transmitting system including a plurality of signal transmission lanes and an idle state detector, wherein the signal transmission lane includes a differential transmitter and a differential receiver, and the differential transmitter comprises:

a transmitting side signal transmitter outputting differential output signals in accordance with differential input signals which are input;

a pair of output terminals outputting the differential output signals from the transmitting side signal transmitter to the differential receiver;

a pair of transmitting side terminating resistors, each of which being connected in parallel between the transmitting side signal transmitter and the pair of output terminals; and a transmitting side terminating resistor connection controller disconnecting the pair of transmitting side terminating resistors from the transmitting side signal transmitter in an idle state where logic data selected as the differential input signals are input, and the differential receiver comprises:

a pair of input terminals to which the differential output signals from the differential transmitter are input;

a receiving side signal transmitter outputting a logic signal determined by symbols of the differential outputs input from the pair of input terminals;

a pair of receiving side terminating resistors, each of which being connected in parallel between the pair of input terminals and the receiving side signal transmitter; and a switch controller capable of disconnecting the pair of receiving side terminating resistors from the receiving side signal transmitter, and the idle state detector comprises:

a signal output circuit for idle state detection outputting a signal for idle state detection on a condition that each logic signal output from each differential receiver of each signal transmission lane outputs the same predetermined logic; and a receiving side terminating resistor disconnection controller detecting the idle state by detecting that time successively outputting the signal for idle detection reaches a predetermined time by the signal output circuit for idle state detection, and controlling the switch controller of the differential receiver in each signal lane to performing the disconnecting of the pair of receiving side terminating resistors from the receiving side signal transmitter upon detection of the idle state, and wherein the operating state detector includes an edge-triggered flip-flop circuit detecting a change of the output of the receiving side signal transmitter from the predetermined logic to another logic, and the differential receiver controls the receiving side terminating resistor connection controller so as to connect the pair of receiving side terminating resistors to the receiving side signal transmitter upon detection of the change by the flip-flop circuit.

* * * * *